June 14, 1966  A. SALZER  3,256,159
WATER PURIFICATION APPARATUS
Filed July 1, 1963  2 Sheets-Sheet 1

INVENTOR.
ALEXANDER SALZER
BY Plachek & Saulsbury
ATTORNEYS

June 14, 1966 A. SALZER 3,256,159
WATER PURIFICATION APPARATUS
Filed July 1, 1963 2 Sheets-Sheet 2

INVENTOR.
ALEXANDER SALZER
BY
ATTORNEYS

United States Patent Office 3,256,159
Patented June 14, 1966

3,256,159
WATER PURIFICATION APPARATUS
Alexander Salzer, 415 Grand St., New York 2, N.Y.
Filed July 1, 1963, Ser. No. 291,819
7 Claims. (Cl. 202—178)

This invention concerns water purification apparatus, and more particularly is directed at apparatus for providing a continuous supply of fresh water derived from sea water, swamp water, and other sources of salty or brackish water.

According to the invention, the apparatus includes a first tank which continuously receives sea water or other water to be purified. The water passes through a settling tank and filter provided with a sump for removing foreign bodies and debris from the water. The water then passes into a distribution tank from which the water is discharged through a manifold conduit system into a plurality of evaporation trays movably disposed on a heater. Over the trays is a hood which collects vaporized water and steam arising from the trays and conducts vapor through a coiled condensing pipe to a fresh water discharge outlet and fresh water storage tank. The coiled condensing pipe passes through the distribution tank and warms the water therein while the vapor and steam in the pipe is condensed. A by-pass conduit circuit is provided for vapor which is not condensed in the condensing pipe. This circuit includes a second coiled condensing pipe which passes through the first receiving tank containing cold unpurified water. The vapor in the second condensing pipe completely condenses to water which is returned to the fresh water discharge outlet. Valves are provided for selectively closing the pipes in the water purification apparatus to cut off water flow to tanks and trays so that the tanks and trays can be cleaned. The apparatus is so arranged that any one or more of the evaporation trays can be removed from the apparatus for cleaning without interrupting operation of the apparatus, so that a continuous supply of purified water is assured.

It is therefore a principal object of the invention to provide a simplified apparatus for purifying salty or brackish water to provide a continuous supply of fresh water.

A further object is to provide a water purification apparatus including a plurality of individual removable trays for receiving filtered water to be purified.

Another object is to provide a water purification apparatus in which steam and water vapor arising from evaporation trays is circulated through condensing pipes passing through one or more tanks containing water to be purified for warming water in the tanks while condensing steam and vapor which is passed to a fresh water discharge outlet and storage tank.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 3:
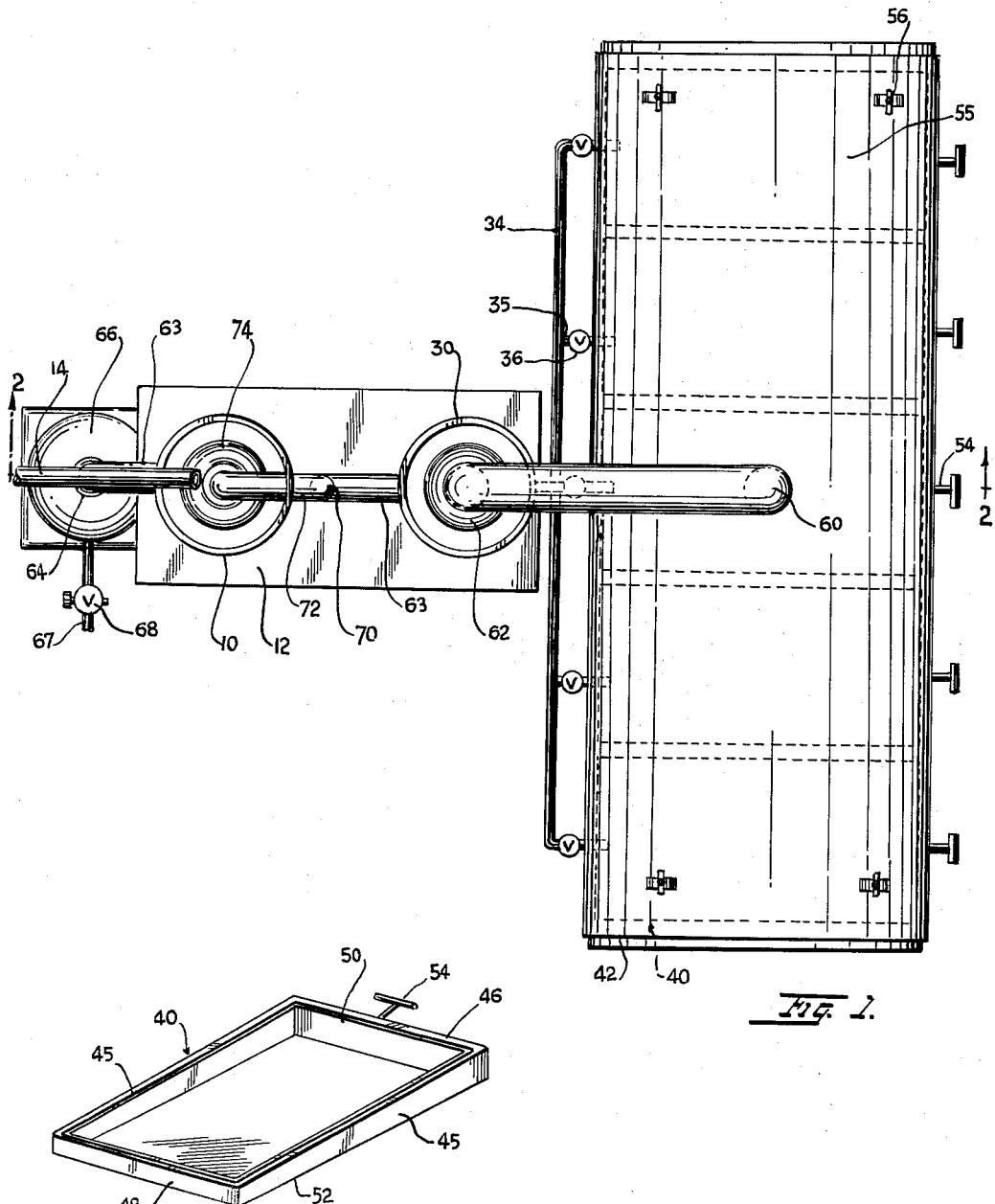
FIG. 1 is a top plan view of water purification apparatus embodying the invention.
FIG. 3 is a perspective view of an evaporation tray.
Figure 2:
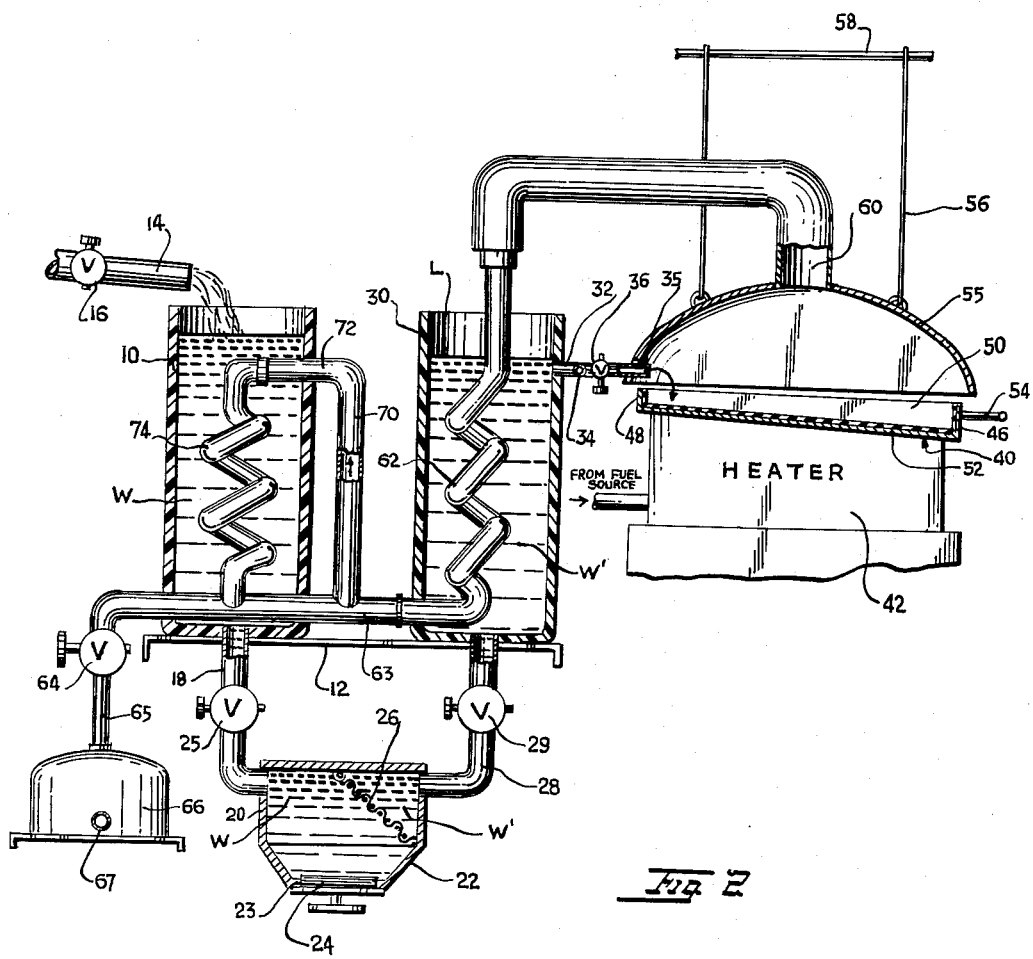
FIG. 2 is a vertical sectional view taken on line 2—2 of FIG. 1, parts of the apparatus being shown in elevation and other parts being shown diagrammatically.

Referring to FIGS. 1 and 2, there is shown the water purification apparatus comprising a first water receiving tank 10. This tank is axially vertical and is mounted on a table 12. Above the open top of the tank 10 is a pipe 14 controlled by a valve 16. Pipe 14 discharges water to be purified into tank 10. Pipe 14 is connected to a pump (not shown) which draws water from the sea or other source of salty or brackish water.

Connected to the bottom of tank 10 is a pipe 18 which terminates at a settling tank 20. The pipe 18 discharges water W into the top of the tank 20. The tank 20 has a sump 22 into which solid particles and debris settle to be drawn off periodically through an opening 23 closed by a plug 24. A valve 25 is located in pipe 18 for controlling or cutting off flow of water therein. A fine mesh screen 26 is located at the top of the tank to block passage of large foreign particles out of tank 20. This screen is disposed in an inclined position so that debris caught by the screen falls to the bottom of the tank 20. Filtered or screened water passes out of tank 20 through a pipe 28 connected to the top of tank 20 diametrically opposite from pipe 18. Valve 29 in pipe 28 controls water flow through this pipe.

Pipe 28 is connected to the bottom of a water distribution tank 30. This tank contains filtered water W'. Near the upper end of tank 30 is connected a pipe 32 which is the common inlet of a manifold 34 having a plurality of branch pipes 35 each controlled by a separate valve 36.

Each of the pipes 35 discharges water W' into the open top of a water evaporation tray 40 removably disposed on the top of a long, horizontal heater or oven 42. This heater may be energized by fuel oil, fuel gas, electricity, or other type of fuel.

Each of trays 40, as clearly shown in FIGS. 2 and 3, is a shallow vessel with narrow parallel, vertical generally trapezoidal walls 45, a wider end wall 46 and a narrower end wall 48. The tray may be made of metal and is preferably lined with a thin coating 50 of a heat and chemical resistant plastic. The trays have sloping bottoms 52 so that salt and other impurities tend to collect near wall 46. A handle 54 is provided for each tray so that the trays can be selectively removed from the heater 42 for cleaning.

Over all the trays is an inverted generally semicylindrical hood 55. This hood is supported at its four corners by cables 56 from a suitable supporting frame 58. At the center of the hood is pipe 60 which receives steam and water vapor arising from the trays 40. The pipe 60 is part of a water vapor condensing system which includes a first helically coiled condenser pipe 62 connected to pipe 60. Pipe 62 passes or extends axially down through tank 30. The bottom end of pipe 62 passes radially outward of tank 30 and terminates at a water collecting pipe 63. Pipe 63 has a valve 64 to which is connected fresh water discharge pipe 65. Pipe 65 is connected to a fresh water storage tank 66 provided with a dispensing pipe 67 controlled by a valve or faucet 68.

The water vapor condensing system includes a by-pass conduit circuit including pipe 63 which passes diametrally through tank 10 near the bottom thereof. In the by-pass circuit is an axially vertical pipe 70 which collects steam and water vapor in pipe 63 leaving tank 30. Pipe 70 and a horizontally extending top portion 72 terminate inside of tank 10 near the top of the tank.

A second helically coiled condenser pipe 74 is connected to pipe portion 70 and extends axially downward in tank 10. Pipe 74 terminates at pipe end 63 to which pipe 74 is connected at its lower end.

In operation of the apparatus, water W to be purified passes continuously into tank 10 from pipe 14. Water flows from tank 10 continuously into tank 20 and is filtered there. The filtered water W' enters tank 30 continuously and leaves tank 30 through distribution pipe 32 at the overflow level L of the tank. The manifold 34 distributes the water through branches 35 to the several trays 40 while water vapor and steam is continuously rising from the trays. Periodically an operator can close one of valves 35 and remove the associated tray 40 from heater 42 for cleaning of collected salt and other foreign matter. If desired, the collected debris taken from the trays can be processed further in suitable apparatus for reclaiming useful and valuable chemicals, minerals, etc. The collected organic and other foreign matter in settling tank 20 can also be collected periodically. When plug 24 is removed for cleaning the tank 20, valves 25 and 29 can be closed. Valve 29 will be closed when tank 30 is being cleaned, and valves 16 and 25 will be closed when tank 10 is being cleaned. Tanks 10 and 30 can be drained through pipes 18, 28 and tank 20.

Fresh water collects in pipe 63 as the steam and water vapor condenses in pipe 62. This water passes through pipe 65 into fresh water storage tank 66 and is dispensed via pipe 67.

If the steam and water vapor do not condense completely in pipe 62, excess steam and water vapor pass up pipe 70 and down through condenser pipe 74 which is cooled by cold water W in tank 10. The fresh water condensing in pipe 74 is drained out through pipe 63 into tank 66. Valve 64 can be adjusted to control the flow of fresh water into tank 66.

It will be noted that any one or more of trays 40 can be removed for cleaning while the apparatus continues to operate. Any of the tanks 10, 20 and 30 can be closed off by the valves for cleaning without interrupting the heating of the trays or supply of fresh water stored in tank 66. Thus the apparatus can supply fresh water continuously while various parts are being drained, cleaned or replaced.

The apparatus is relatively simple to operate. Skilled labor is not required. The apparatus will supply large quantities of fresh water suitable for drinking, cooking and other uses at low cost, largely determined by the cost of the fuel used to energize heater 42.

It is to be understood that the semicylindrical hood 55 may be made of lightweight heat-conducting metal and covered with long sheets of metal foil or plastic, to prevent the formation of corrosion.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling tank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays disposed under the branch pipes respectively for receiving water therefrom, a heater removably supporting the trays for vaporizing water in the trays, a hood over the trays for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, a water vapor collecting pipe connected to the fresh water collecting pipe, a condenser pipe connected to the water vapor collecting pipe and extending down inside the first tank, said fresh water collecting pipe passing through the first tank with the second condenser pipe connected to the fresh water collecting pipe inside the first tank.

2. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling tank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays disposed under the branch pipes respectively for receiving water therefrom, a heater removably supporting the trays for vaporizing water in the trays, a hood over the trays for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, a water vapor collecting pipe connected to the fresh water collecting pipe, a condenser pipe connected to the water vapor collecting pipe and extending down inside the first tank, said fresh water collecting pipe passing through the first tank with the second condenser pipe connected to the fresh water collecting pipe inside the first tank, and a fresh water storage tank connected to the fresh water collecting pipe.

3. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling tank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays disposed under the branch pipes respectively for receiving water therefrom, a heater removably supporting the trays for vaporizing water in the trays, a hood over the trays for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, a water vapor collecting pipe connected to the fresh water collecting pipe, a condenser pipe connected to the water vapor collecting pipe and extending down inside the first tank, said fresh water collecting pipe passing through the first tank with the second condenser pipe connected to the fresh water collecting pipe inside the first tank, a fresh water storage tank connected to the fresh water collecting pipe, and valves in each of the branch pipes so that water supplied thereto can be cut off selectively therefrom and associated trays can be removed from the heater for cleaning while remaining trays continue to receive water for evaporation from the second tank.

4. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling tank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays disposed under the branch pipes respectively for receiving water therefrom, a heater removably supporting the trays for vaporizing water in the trays, a hood over the trays for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, a water vapor collecting pipe connected to the fresh water collecting pipe, a condenser pipe connected to the water vapor collecting pipe and extending down inside the first tank, said fresh water collecting pipe passing through the first tank with the second condenser pipe connected to the fresh water collecting pipe inside the first tank, a fresh water storage tank connected to the fresh water collecting pipe, and valves in each of the branch pipes so that water supplied thereto can be cut off selectively therefrom and associated trays can be removed from the heater for cleaning while remaining trays continue to receive water for evaporation from the second tank, valves in the conduits for closing off the settling tank from the first and second tanks while the settling tank is being cleaned, and a removable cleanout plug at the bottom of said sump.

5. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling ank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays dispuosed under the branch pipes respectively for receiving water therefrom, means for heating and vaporizing water in the trays, hood means for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, each of said trays having a handle to facilitate removal of the trays from the heater.

6. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling tank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays disposed under the branch pipes respectively for receiving water therefrom, a heater removably supporting the trays for vaporing water in the trays, a hood over the trays for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, each of said trays having a handle to facilitate removal of the trays from the heater, each of the trays having a heat and chemical resistant lining, each tray having a narrow end wall, a wider opposite end wall, two generally trapezoidal side walls, and a rectangular bottom sloping down from the narrow end wall to the wider end wall to facilitate collecting salt and foreign matter in the tray near the wider end wall.

7. Water purification apparatus, comprising a first upright axially vertical tank for receiving water to be purified from a source thereof, a second upright axially vertical water distribution tank disposed near the first tank, a settling tank including a bottom sump, a first conduit connecting the first tank to an inlet of the settling tank, a second conduit connecting an outlet of the settling tank to the second tank, filter means at the outlet of the settling tank to exclude debris from the second tank, a water distribution pipe connected to the second tank near the top thereof for discharging water therefrom, a manifold with multiple branch pipes connected to the water distribution pipe, a plurality of horizontally disposed shallow trays disposed under the branch pipes respectively for receiving water therefrom, a heater removably supporting the trays for vaporizing water in the trays, a hood over the trays for collecting water vapor from the trays, a water vapor transfer pipe connected to the hood for receiving water vapor therefrom, a coiled water vapor condenser pipe connected to the transfer pipe and extending downwardly through the second tank, a fresh water collecting pipe connected to the condenser pipe and extending out of the bottom of the second tank, and a fresh water storage tank connected to the fresh water collecting pipe, a water vapor collecting pipe connected to the fresh water collecting pipe, a condenser pipe connected to the water vapor collecting pipe and extending down inside the first tank, said fresh water collecting pipe passing through the first tank with the second condenser pipe connected to the fresh water collecting pipe inside the first tank, a fresh water storage tank connected to the fresh water collecting pipe, and valves in each of the branch pipes so that water supplied thereto can be cut off selectively therefrom and associated trays can be removed from the heater for cleaning while remaining trays continue to receive water for evaporation from the second tank, valves in the conduits for closing off the settling tank from the first and second tanks while the settling tank is being cleaned, and a removable cleanout plug at the bottom of said sump, each of the trays having a heat and chemical resistant lining, each tray having a narrow end wall, a wider opposite end wall, two generally trapezoidal side walls, and a rectangular bottom sloping down from the narrow end wall to facilitate collecting salt and foreign matter in the tray near the wider end wall.

References Cited by the Examiner

UNITED STATES PATENTS

| | | |
|---|---|---|
| 645,790 | 3/1900 | Conover. |
| 983,424 | 2/1911 | Brosius. |
| 2,455,834 | 12/1948 | Ushakoff. |
| 2,617,759 | 11/1952 | Joyner _____ 202—186 |
| 2,832,726 | 4/1958 | Norment _____ 202—236 X |
| 3,006,818 | 10/1961 | Lappala et al. |

NORMAN YUDKOFF, *Primary Examiner.*

F. E. DRUMMOND, *Assistant Examiner.*